Dec. 30, 1969    G. LANGE    3,486,185
CASTER COVER
Filed March 27, 1967
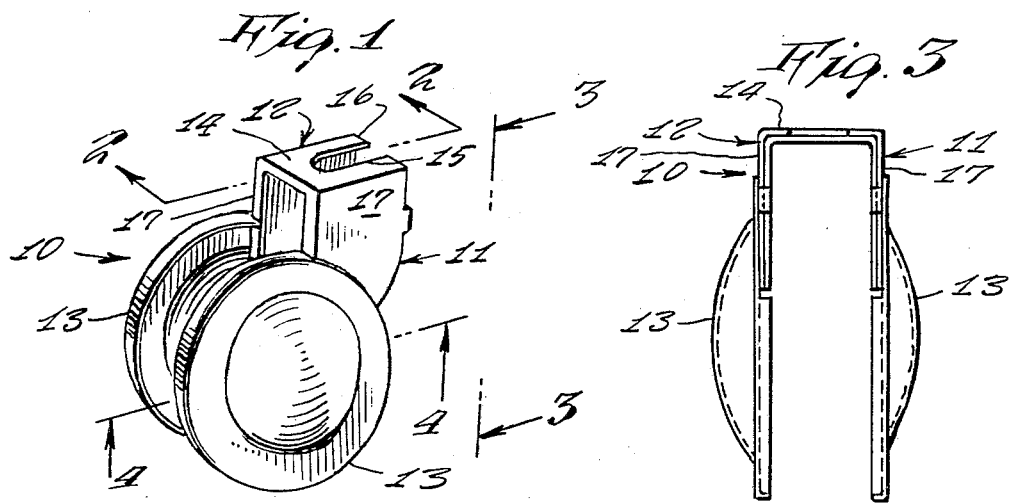
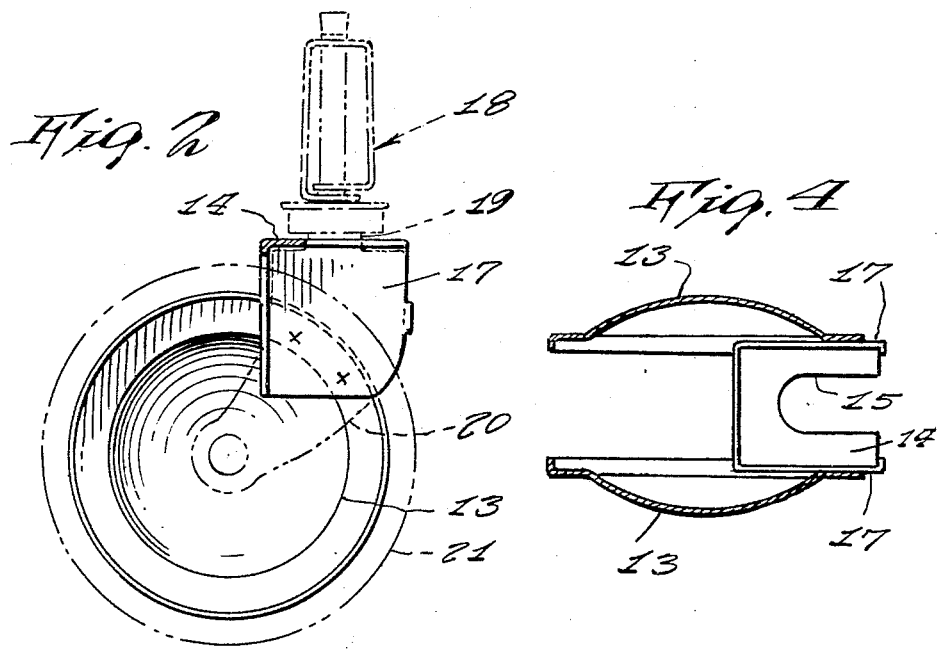
INVENTOR
GERHARD LANGE United States Patent Office 3,486,185
Patented Dec. 30, 1969

3,486,185
CASTER COVER
Gerhard Lange, 206 McKinley, Ave.,
Franklin Square, N.Y. 11101
Filed Mar. 27, 1967, Ser. No. 626,007
Int. Cl. B60b 33/00
U.S. Cl. 16—18                                    2 Claims

ABSTRACT OF THE DISCLOSURE

A decorative case for enclosing a conventional castor wheel, the case including outwardly dished discs for enveloping each side of the wheel and side panels for enclosing the side plates of the castor frame.

---

This invention relates generally to casters; more specifically it relates to decorative enclosures for casters.

A principal object of the present invention is to provide a castor cover for enclosing a castor in a decorative manner and which can be easily fitted over the castor with minimum effort.

Another object is to provide a castor cover comprising a singular piece which can be easily molded of attractively colored plastic material or formed from metal or other material and painted.

Yet another object is to provide a castor cover which may be made in any size to accommodate all casters.

Other objects are to provide a castor cover which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention,

FIGURE 2 is a cross sectional view taken on line 3—3 of FIGURE 1,

FIGURE 3 is a rear elevation view as viewed in line 3—3 of FIGURE 1, and

FIGURE 4 is a cross sectional view taken on line 4—4 of FIGURE 1.

Referring now to the drawing in detail, the reference numeral 10 represents a castor cover according to the present invention wherein there is a one-piece member 11 comprised of a generally U-shaped frame portion 12 and a dished disc 13 adjacent each side thereof.

The frame portion 12 includes a top wall 14 having a slot 15 that opens out on a rear edge 16, and a pair of side walls 17, the upper edges of which are adjacent the side edges of the top wall.

The disc 13 integrally formed with the side walls 17 are outwardly dished for an attractive appearance.

In use, the castor cover is fitted over castor 18 with the castor post 19 placed in slot 15, the castor frame side plates 20 being between side walls 17 and the castor wheel 21 being between the discs 13.

It will be further understood that the castor cover is not only decorative, but also serves as a dust protector for the wheel, axial and bearings.

The novel features and the operation of this device will be apparent from the foregoing description. While the device has been shown and the structure described in detail, it is obvious that this is not to be considered limited to the exact form disclosed, and that changes may be made therein within the scope and the spirit of the invention.

Having thus set forth and disclosed the nature of this invention, what is claimed is:

1. A castor cover comprising a pair of spaced parallel discs integrally depending from a U-shaped member having a top wall transversely disposed to the discs, said top wall having a slot opening out from one edge of the wall adapted to receive the post of a wheeled castor, said member adapted to fit snugly over and about the castor frame when the post is centered within the slot, said discs being dished out centrally to cover substantially the castor wheels side surfaces thereby protecting and beautifying said castor.

2. A castor cover as in claim 1 wherein the member includes sides which cover the side walls of the castor from which carries the castor axle and wheel.

References Cited

UNITED STATES PATENTS 1,285,142   11/1918   Happensack.
2,129,579   9/1938    Herold.
2,483,241   9/1949    Shepherd.
2,981,969   5/1961    Fontana.

BOBBY R. GAY, Primary Examiner

D. L. TROUTMAN, Assistant Examiner

U.S. Cl. X.R.
8—226